United States Patent Office 3,759,885
Patented Sept. 18, 1973

3,759,885
VINYL CHLORIDE POLYMERS AND METHODS OF PREPARING THEM
Jean Claude Thomas and Francis Fournel, Lyon, and Salomon Soussan, Saint-Fons, France, assignors to Produits Chimiques Pechiney-Saint-Gobain, Neuilly-sur-Seine, France
No Drawing. Continuation of abandoned applications Ser. No. 648,965 and Ser. No. 649,014, both June 26, 1967. This application Sept. 16, 1970, Ser. No. 72,864
Claims priority, application France, June 28, 1966, 67,215, 67,216
Int. Cl. C08f 3/22
U.S. Cl. 260—92.8 R           9 Claims

ABSTRACT OF THE DISCLOSURE

The polymerization in mass of vinyl chloride, alone or in combination with compatible monomers, is carried out in two distinct stages separated in time or in time and space, with sharp differences in temperature and intensity of agitation, producing superior polymers.

---

This application is a combination and continuation of applications Ser. No. 648,965, filed June 26, 1967 (now abandoned), and Ser. No. 649,014, filed June 26, 1967 (now abandoned).

This invention relates to the production of polymers, a term which includes homopolymers and copolymers, of vinyl chloride, in two stages separated in time or in time and space, and to the products of said process which have improved qualities and improved granulometry as compared to prior polymers of vinyl chloride. It is to be understood that in making comparisons between our processes and products with the products and processes of the prior art similar conditions and reagents should be employed, except for those which make the present processes distinctive. The invention relates to the processes of polymerization in bulk, also called polymerization in mass, which means, generally speaking, polymerization in the absence of solvents, diluents and suspension media.

The polymerization, a term which also includes copolymerization, of vinyl chloride in mass is disclosed in U.S. Pat. No. 3,522,227 wherein polymerization has been carried out in two stages—in the first of which very high turbulence is employed until about 7–15% of the monomer has been polymerized, the process being continued in a second stage in another autoclave with mild agitation which is only sufficient to maintain proper thermal exchanges and temperature control. In that process the temperature selected was maintained throughout the process although the two stages were carried out in autoclaves of different type. Several forms of apparatus are described in that application of which a preferred form included a first autoclave called a prepolymerizer equipped with a high speed stirrer of turbine or bicone type and a second autoclave equipped with a stirrer of paddle type rotating slowly near the wall. The first autoclave was frequently vertical and considerably smaller than the second autoclave, which was horizontal in some forms. French Pat. 1,382,072 can be consulted for further details. Advantages of that process were the production of a product, unsorted and fresh from the autoclave, which was spherical, of relatively high apparent density compared to other products of polymerization in mass, and of granulometry concentrated in relatively few sizes, the granulometry concentrated in relatively few sizes, the granulometry being controllable.

In French Pat. 1,436,744 it was proposed to carry out the prepolymerization on a fraction of the total monomer, that partly polymerized product being transferred from the prepolymerizer to the main autoclave while still liquid where it was joined by additional monomer.

Another method of polymerizing polyvinyl chloride in bulk in a single autoclave, has been described in U.S. Pat. No. 3,522,227; in that method a first stage of polymerization is carried to about 7–15% completion with high turbulence, and a second stage completes the polymertzation with low turbulence, an agitation preferably so quiet that it just assures thermal homogeneity. The reaction has been carried out at temperatures from about 20 to 75° C., under relative pressures of 2 to 14 bars. Among the notable achievements of that method are improved granulometry of the product, including the production of dense, spherical grains in concentrated sizes the final sizes of which can be controlled during production.

It is an object of this invention to improve that already successful product by a novel method. Specific objects are to produce a product of higher softening point, and improved bending temperature, while achieving a low index of viscosity for ease in the application of the shaping techniques used in the manufacture of articles from the polymer.

It is an object of the present invention to improve the qualities of such products although the qualities of those products were already exceptional. Another object is to increase the yield, further concentrate the granulometry, further increase the apparent density, and to increase the temperatures of bending and softening while preserving an index of viscosity which permits the use of these improved resins by the processes and in the apparatus customarily employed for shaping and molding polyvinyl chloride and its copolymers.

The objects of the invention are accomplished, in one mode, by a method of polymerizing a polymerization mass comprising vinyl chloride in bulk which comprises establishing two interconnected but separable sites of polymerization of which the first can be maintained under conditions of high turbulence, of pressure sufficient to maintain vinyl chloride in liquid phase, and at a temperature range from 20° to 75° C., and of which the second can be maintained under conditions of low turbulence related to good morphology and minimum requirements of heat exchange, of substantially lower temperature in a range from —60° to 20° C., and of pressure sufficient to maintain vinyl chloride in liquid phase, the two sites being interconnected for rapid transfer of the contents of the first to the second without harmful alteration of conditions, admitting vinyl chloride and a catalyst for the polymerization thereof to the first site and polymerizing it to an end point of about 7 to about 15% polymerization under the high turbulence, first site conditions aforesaid and preferably about 50° to 70° C. and 7–12 bars pressure, transferring the partly polymerized mass to the second site and continuing the polymerization under the low turbulence, second site conditions aforesaid and preferably about —20° to 0° C. and corresponding pressure to a selected end point of advanced polymerization. The superiority of the products has been established by comparing the products of this invention with products which are qualitatively and quantitatively similar as prepared by prior processes, utilizing the best prior products and processes for purposes of comparison.

In the present invention the first stage is carried out in a prepolymerizer with high turbulence throughout the reaction mass under conditions of temperature and pressure comparable to the so-called warm processes of the prior art until conversions of 7–15%, preferably 8–10%, have been obtained. The system includes a catalyst of short half life, the activity of which is terminated or materially reduced by the time the first stage has reached its end. The reaction mass is then transferred to one or more other autoclaves to accomplish the second stage of polymerization with mild agitation in the cold and in the presence of catalysts of long half life of which preferred types are exemplified by the so-called Redox and other systems. The cold stage may also include an agent for breaking ethylenic bonds, and a lower alcohol. The agitatation during the second, cold state is mild and just sufficient to assure good morphology of the resin and thermal homogeneity.

The objects of the invention as to process are achieved in another mode, by a method of polymerizing a monomeric mass, comprsing a preponderant part of vinyl chloride in bulk in an autoclave, which comprises subjecting the mass in liquid phase to conditions of catalysis favorable to polymerization in a warm temperature range from about 20° C. to about 75° C. with agitation of high turbulence, ending this stage of polymerization when the polymerization has attained about 7% to about 12% of completion, rapidly and substantially cooling the mass to below 20° C. into a cold range extending to about −60° C., and continuing the polymerization with agitation of low turbulence to a selected end point. There may also be added in the second stage a bond-breaking agent, such as transdichloroethylene, and an alcohol of low molecular weight such as methanol. The new products are homopolymers of vinyl chloride having properties equivalent to an Afnor index of viscosity of about 100 to 400 and a softening point about 86–87° C. or copolymers of vinyl chloride with compatible monomers of which vinyl acetate, vinylidene chloride, vinyl stearate, and the acrylic monomers such as methyl acrylate, ethyl acrylate, and isooctyl acrylate, are exemplary.

In determining comparative quality one tests a selected product of the present process against product made from ingredients which are qualitatively and quantitatively alike but are polymerized with constant speed of agitation and the high temperature technique (20°–75° C. throughout). In each instance the product of this case is markedly and surprisingly superior.

Other objects of the invention are to produce polymers having relatively high apparent density, a concentration of the product within a narrow range of particle sizes, reduction of the content of gross and fines, by which are meant particles too large and too small to be desirable in the product sold, and to develop novel and useful variants of the process and product for particular purposes.

In one variant of the new method the first or high turbulence, hot stage is applied to a quantity of monomer too small to provide the quantity of product desired from the operation, and when it has attained 7–15% polymerization it is mixed with more and cold monomer, the polymerization proceeding to its selected end point in the cold.

A variant of the process omits the bond-breaking agent from the second, cold stage of the process, which produces polymers (a term which includes copolymers) of higher molecular weight and higher index of viscosity. For example, where the polymer might have an index of viscosity circa 100 when produced in the presence of such an agent it might have an index of viscosity between 150 to 400 when polymerized in its absence, other conditions being alike.

In this invention polymerization, either alone or with a comonomer, is preferably carried out in a first stage with agitation of turbulence as high as possible under classical conditions of temperature and pressure, generally between 20° C. and 75° C. and corresponding relative pressures of 2–14 bars, a preferred range being between 50° and 70° C. and 7–12 bars, until about 7 to 12%, generally 9 to 11%, polymerization has occurred. A preferred catalyst for this warm stage of the process has a short half life under the conditions of reaction. After this degree of polymerization has been attained the reaction mass is chilled, preferably as rapidly as possible, to establish cold conditions of temperature and pressure.

In the cold stage of polymerization the general range of temperatures is between −60° and +20° C. and pressures from 65 mm. of mercury absolute to 2 bars relative, the temperatures generally used being between −20° C. and 0° C. with pressures of 610 mm. absolute to 0.75 bar. relative. The two ranges meet at 20° C. but it is to be understood that a substantial difference in temperature must be established between the warm and cold operations and that it is advisable to follow the preferred ranges.

Among the catalysts of short half life which are employed in the warm stage of the polymerization are acetylcyclohexanesulfonyl peroxide, isopropyl peroxydicarbonate, and ethylhexyl peroxydicarbonate. For further reference to such catalysts French Pat. 1,427,935 may be consulted.

Among the Redox catalysts of long half life which are used during the cold stage of polymerization are systems employing hydrogen peroxide, ferric sulfate and ascorbic acid, systems employing a peroxide and a complex of trialkylboron with hydrazine, and systems formed by peroxides, trialkylboron complexes with hydrazine, and molecular oxygen. For further information concerning such systems French Pats. 1,257,583 and 1,474,147 may be consulted.

Among the agents for breaking ethylenic bonds during the cold stage of polymerization are halogenated lower hydrocarbons as transdichloroethylene, perchloroethylene, carbon tetrachloride and bromoform.

Among the alcohols of low molecular weight which are used in the cold stage of polymerization are methanol, ethanol, and isopropanol.

Autoclaves of any type which heretofore have been successfully used for the polymerization of vinyl chloride can be employed in this invention provided they have means for achieving high turbulence in the first stage and mild turbulence in the second. In some cases where a single autoclave is used a single agitator may be driven at high and low speeds to achieve the different states of turbulence and sometimes the atuoclave will be equipped with two types of agitator.

The new products as they are discharged from the manufacturing process, without sizing, have high apparent density, concentrated granulometry, properties which combine with desirable properties imparted in polymerization in the cold, that is to say higher temperature of bending and softening and at the same time the new polymers have an index of viscosity which allows them to be easily worked by traditional methods.

The new polymers combine properties of mass and volume (apparent density) and granulometric concentration which are excellent. They also have intrinsic properties which are superior to those produced from like ingredients under warm conditions of polymerization, including an improved flexing temperature and a higher softening temperature. At the same time these new polymers have a low index of viscosity which permits them to be employed with great ease in pressure shaping techniques such as extrusion molding. For example, a homopolymer of vinyl chloride prepared in the presence of a bond-breaking agent under the conditions of the present invention had an index of viscosity (Afner) of 100 and a softening point of 87° C., whereas polyvinyl chloride prepared by an identical technique except that both stages were at warm temperature, as defined above, had an index of viscosity of 100 but a softening point of only 77° C. The softening point was measured by the system ASTM/D 1043. When the bond-breaking agent was omitted, the softening point remained about the same, 86° C., but the index of viscosity attained 230. The granulometry and apparent density of the product remained the same as that produced by the new process including the bond-breaking agent.

The invention is as applicable to the polymerization of vinyl chloride in admixture with other, compatible monomers as to vinyl chloride itself and has the great advantage that higher contents of such comonomers can be incorporated than has been permitted by standard processes. Among compatible comonomers are vinyl acetate, vinylidene chloride, vinyl stearate, and acrylates such as methyl acrylate, ethyl acrylate, isooctyl acrylate. The optimum temperature to be employed in the warm and cold stages of the invention can be determined by test for each combination of monomers. The superior compatibility of comonomers under the conditions of this invention extends to the two stage process of polymerization, both stages of which are carried out at warm temperatures as defined above.

The polymers having a vinyl chloride base which are produced by the present invention may be used as classical resins are used for the formation of articles and shaped pieces by molding, extrusion, calendering and the like and they are particularly appropriate for use in these techniques which have been applied to polymers heretofore wholly prepared in the cold.

The following examples illustrate the invention without detracting from the generality of what has been elsewhere herein stated.

EXAMPLE 1

For purposes of comparison this entire operation was carried out in the cold with mild agitation only.

A horizontal autoclave of stainless steel having a capacity of 500 l. and a ribbon-blender agitator received 132 kg. of vinyl chloride monomer of which 12 kg. were used to purge the autoclave of other gases. The agitator was rotated at 30 r.p.m. and the reaction medium was rapidly cooled to −20° C. after which 30 kg. of transdichloroethylene and 0.450 kg. of ascorbic acid dissolved in 10 kg. of methanol were admitted through a conduit which was rinsed with 1 kg. of methanol. Thereafter 0.450 kg. of hydrogen peroxide containing 35% free oxygen was added and the conduit was again rinsed with 1 kg. of methanol. For 15 minutes agitation was continued and 0.225 l. of a 1% aqueous solution of ferric sulfate was added and the conduit was rinsed with 3 kg. of methanol. Polymerization proceeded for 20 hours at −20° C. and absolute pressure of 610 mm. of mercury. The unreacted monomer was discharged and recovered and a 78% yield of a powdery polymer having a K index (Fikentscher) of 64 and an apparent density of 0.28 was obtained. Its granulometry was tested and found to be widely dispersed as shown by the following table:

TABLE 1

| Screen openings (micron): | Percent fallthrough |
|---|---|
| 630 | 90 |
| 500 | 85 |
| 400 | 84 |
| 315 | 80 |
| 250 | 73 |
| 200 | 63 |
| 160 | 63 |
| 100 | 63 |
| 63 | 53 |

EXAMPLE 2

This example describes the application of the present invention. The autoclave of Example 1 received 170 kg. of vinyl chloride monomer of which 20 kg. were used to purge the autoclave. 8.33 g. of acetylcyclohexanesulfonyl peroxide were added, corresponding to 0.0004% of active oxygen based on the weight of the monomer undergoing reaction. The ribbon blender was rotated at 100 r.p.m. and the reaction temperature set at 62° C., the corresponding pressure being 9.3 bars. After an hour 8% polymerizaiton had occurred, the speed of rotation was reduced to 30 r.p.m. and that speed was maintained through the remainder of the process. The temperature was rapidly reduced to −20° C. and the following additions were made to the reaction mass: 37.5 kg. of transdichloroethylene, 0.450 kg. of ascorbic acid dissolved in 10 kg. of methanol. The charging conduit was rinsed with 2 kg. of methanol and 0.450 kg. of hydrogen peroxide containing 35% free oxygen was added. The charging conduit was again rinsed with 2 kg. of methanol and the reaction was agitated for 15 minutes, after which 0.225 l. of a 1% aqueous solution of ferric sulfate was added and the conduit was rinsed with 5 kg. of methanol. Polymerization continued for 15 hours at −20° C. and 30 r.p.m. of the agitator. The internal absolute pressure was 610 mm. of mercury. The total duration for both stages of polymerization was 16 hours.

The unreacted monomer was discharged and the vinyl chloride was recovered with a yield of 80% of a powdery polymer having a K index of 64 and an apparent density of 0.45. The granulometry of the product is more concentrated than that of Example 1 as shown in Table 2.

TABLE 2

| Screen openings (micron): | Percent fallthrough |
|---|---|
| 630 | 90 |
| 500 | 90 |
| 400 | 88 |
| 315 | 87 |
| 250 | 85 |
| 200 | 80 |
| 160 | 78 |
| 100 | 30 |
| 63 | 25 |

A particular avantage of this invention over the process of Example 1 is a reduction of 20% in total time required for polymerization, which gives great economic value to the process.

EXAMPLE 3

Into the same autoclave, in which the ribbon blender had been replaced by a double-blade paddle, after purging the apparatus by vaporizing 20 kg. of vinyl chloride monomer, 170 kg. of vinyl monomer were introduced. Polymerization was under conditions identical to Example 2 and the production was 84% of a powdery polymer having a K index of 64, and an apparent density of 0.48. The granulometry was concentrated, the distribution of sizes being given in Table 3.

TABLE 3

| Screen openings (micron): | Percent fallthrough |
|---|---|
| 630 | 94 |
| 500 | 92 |
| 400 | 90 |
| 315 | 88 |
| 250 | 87 |
| 200 | 80 |
| 160 | 65 |
| 100 | 25 |
| 63 | 20 |

EXAMPLE 4

A vertical autoclave of 2,000 l. capacity having a spiral agitator moving close to the wall received 550 kg. of vinyl chloride monomer of which 50 kg. were released to purge other gases. The agitator was rotated at 30 r.p.m. and the temperature rapidly lowered to −20° C. and 610 mm. of mercury absolute. 125 kg. of transdichloroethylene and 1.875 kg. of ascorbic acid in 40 kg. of methanol were added and the charging conduit was flushed with 4 kg. of methanol. 1.875 kg. of hyrogen peroxide containing 35% free oxygen were added and the conduit was rinsed with 4 kg. of methanol. The reaction mass was agitated for 15 minutes and 0.088 l. of a 1% aqueous solution of ferric sulfate were added and the charging conduit was rinsed with 4.5 kg. of methanol. The polymerization was carried out for 20 hours at a temperature of —20° C. and 610 mm. of mercury. After releasing the unreacted monomer the recovery of polymer was 78%. The polymer was a powder having a K index of 64 and an apparent density of 0.3, of which the granulometry was dispersed in accordance with Table 4.

TABLE 4

| Screen openings (micron): | Percent fallthrough |
|---|---|
| 630 | 92 |
| 500 | 86 |
| 400 | 82 |
| 315 | 80 |
| 250 | 75 |
| 200 | 68 |
| 160 | 62 |
| 100 | 60 |
| 63 | 50 |

EXAMPLE 5

The autoclave of Example 4 received 715 kg. of vinyl chloride of which 75 kg. were released to purge the autoclave. 36.09 g. of acetylcyclohexanesulfonyl peroxide were added, corresponding to 0.0004% of active oxygen on the weight of the monomer. The agitator was rotated at 75 r.p.m. during the first stage of polymerization, the temperature being at 62° C., and 9.3 bars for one hour. The transformation was 8% and the speed of rotation was reduced to 10 r.p.m. which was maintained throughout the remainder of the polymerization. The temperature was rapidly reduced to —20° C. and 610 mm. of mercury absolute pressure and 162.5 kg. of transdichloroethylene and 2.440 kg. of ascorbic acid dissolved in 60 kg. of methanol were added and the charging conduit was rinsed with 5 kg. of methanol. 2.440 kg. of hydrogen peroxide of 35% free oxygen were added and the conduit was rinsed with 5 kg. of methanol. The reaction medium was agitated for 15 minutes and 1.220 l. of an aqueous solution of 1% of ferric sulfate was added, followed by a final rinsing by 11.25 kg. of methanol. The second stage of the operation continued 15 hours at —20° C. and 610 mm. of mercury, of total duration of both stages being 16 hours. After release of the vinyl monomer a yield of 85% polymer was obtained having a K index of 64, an apparent density of 0.47, and the concentrated granulometry of Table 5.

TABLE 5

| Screen openings (micron): | Percent fallthough |
|---|---|
| 630 | 95 |
| 500 | 94 |
| 400 | 92 |
| 315 | 90 |
| 250 | 88 |
| 200 | 85 |
| 160 | 80 |
| 100 | 20 |
| 63 | 15 |

Comparison of Table 5 with Table 4 shows a concentration in fewer sizes and a great reduction in the content of fines and gross. Furthermore, the advantages are the same for a total identical transformation and the time required for polymerization is substantially reduced.

Example 6

This operation was carried out without a bond-breaking agent. The autoclave of Example 4 was used but the helical stirrer was replaced with one having an exterior diameter only about half that of the autoclave. 770 kg. of vinyl chloride monomer were added and 70 kg. were vaporized to sweep out the autoclave. The agitator was rotated at 30 r.p.m., the temperature was reduced to —20° C. and 610 mm. of mercury. 1.312 kg. of ascorbic acid dissolved in 60 kg. of methanol were added, the charging tube was rinsed with 5 kg. of methanol and 1.312 kg. of 35% hydrogen peroxide were added, the conduit again being rinsed with 5 kg. of methanol. The reaction mass was agitated 10 minutes and 0.656 l. of 1% aqueous ferric sulfate solution was added and the conduit was rinsed with 17.5 kg. of methanol. The polymerization proceeded 20 hours at —20° C., 610 mm. of mercury, and 30 r.p.m. After releasing the unreacted monomer the yield was 74% of a polymer powder having a K index of 90±1, an apparent density of 0.31, and a dispersed granulometry as recited in Table 6.

TABLE 6

| Screen openings (micron): | Percent fallthrough |
|---|---|
| 630 | 92 |
| 500 | 88 |
| 400 | 85 |
| 315 | 84 |
| 250 | 82 |
| 200 | 78 |
| 160 | 75 |
| 100 | 65 |
| 63 | 50 |

Example 7

The autoclave of Example 6 was used and received 990 kg. of vinyl chloride monomer. The autoclave was purged with 90 kg. of monomer. 49.97 g. of acetylcyclohexanesulfonyl peroxide were added, furnishing 0.0004% of active oxygen by weight of the monomer. The speed of rotation was 75 r.p.m. during the first high temperature stage of operation. The temperature of the reaction medium was 62° C. and 9.3 bars. After 1 hour 9% polymerization had occurred, the speed of rotation was reduced to 10 r.p.m. which was maintained throughout the second stage. The temperature was rapidly reduced to —20° C. and 610 mm. of mercury. 1.588 kg. of ascorbic acid in 80 kg. of methanol were added, the charging conduit was rinsed with 5 kg. of methanol and 1.588 kg. of 35% hydrogen peroxide were added and the conduit was rinsed with 5 kg. of methanol. The agitator was run for 10 minutes and 0.794 l. of a 1% aqueous solution of ferric sulfate was added, the final rinsing being with 22.5 kg. of methanol. The second stage of polymerization was carried out in 14 hours at —20° C. and 610 mm. of mercury for a total duration of 15 hours. After discharging the unreacted monomer the yield was 85% of a powdery polymer having a K index of 90±1, an apparent density of 0.47, and the concentrated granulometry of Table 7.

TABLE 7

| Screen openings (micron): | Percent fallthrough |
|---|---|
| 630 | 99 |
| 500 | 99 |
| 400 | 98 |
| 315 | 97 |
| 250 | 95 |
| 200 | 90 |
| 160 | 89 |
| 100 | 25 |
| 63 | 10 |

The reduction of fines and gross are notable. The yield was 85% against 74% for Example 6, the apparent density was 0.47 against 0.31, and 65% of the product was between 100 and 200 microns in size whereas the product of Table 6 had only 13% in that range.

Example 8

A cylindrical, vertical, 200 l. prepolymerizer received 165 kg. of vinyl chloride of which 15 kg. were released to purge it. Acetylcyclohexanesulfonyl peroxide, 8.33 g., were added, furnishing 0.0004% active oxygen based on the weight of monomer treated. The speed of rotation of the agitator, a turbine of 160 mm. diameter, was 710 r.p.m., the temperature was set at 62° C. and 9.3 bars, and when the degree of polymerization reached about 9% the polymerization mass, containing monomer and polymer suspended in it, was transferred to a purged, horizontal, cylindrical autoclave of 500 l. capacity agitated by a ribbon blender rotating close to the wall at 10 r.p.m. The autoclaves were equipped with cooling jackets for temperature control, that of the second stage being connected to a strong refrigerating unit. The temperature of the charge in the second autoclave was rapidly reduced to —20° C. and 610 mm. mercury absolute pressure.

The catalytic requirements were met by injecting 37.5 kg. transdichloroethylene with 0.450 kg. ascorbic acid in 10 kg. methanol, rinsing the charging conduit with 2 kg. methanol, adding 0.450 kg. hydrogen peroxide (35%), and rinsing with 2 kg. methanol. The agitator was run at 10 r.p.m. for 15 minutes and 0.225 l. of an aqueous 1% solution of ferric sulfate was added and the conduit was rinsed with 5 kg. methanol.

The final polymerization continued 15 hours at —20° C. and 610 mm. mercury for a total, two-step polymerization of 16 hours. The autoclave was vented and the product discharged, the yield being 88%, of the weight of the monomer subjected to polymerization, of spherical granules having a K index (Fikentscher) of 64, an apparent density of 0.49, and concentrated granulometry corresponding to Table 8.

TABLE 8

| Screen openings (micron): | Percent fallthrough |
|---|---|
| 630 | 99 |
| 500 | 98 |
| 400 | 94 |
| 315 | 92 |
| 250 | 90 |
| 200 | 85 |
| 160 | 78 |
| 100 | 15 |
| 63 | 10 |

It will be observed that 75% of the yield had particle sizes between 100 and 250 microns.

EXAMPLE 9

The prepolymerizer of Example 8 was used as in Example 8 and the partly polymerized product of the first stage was transferred to the second autoclave in which the ribbon blender had been replaced by a double blade, paddle agitator and the conditions of the second stage of Example 8 were repeated. The yield was 86%, the K index 64, the apparent density 0.50, and the granulometry as in Table 9.

TABLE 9

| Screen openings (micron): | Percent fallthrough |
|---|---|
| 630 | 99 |
| 500 | 99 |
| 400 | 98 |
| 315 | 95 |
| 250 | 92 |
| 200 | 85 |
| 160 | 80 |
| 100 | 12 |
| 63 | 8 |

80% of the yield was between 100 and 250 microns in size.

EXAMPLE 10

A vertical, stainless steel prepolymerizer of 1000 l. capacity having provision for either a 300 mm. typhon turbine of 720 r.p.m. or a six-blade "Lightnin" of 305 mm. operating at 300 r.p.m., received 715 kg. of vinyl chloride of which 65 kg. were vented for purging. 36.09 g. of acetylcyclohexanesulfonyl peroxide, supplying 0.004% active oxygen, were added and the temperature was established at 62° C. and 9.3 bars. After an hour of polymerization, with either agitator running as indicated, the polymerization had attained about 9% and the reaction mass was transferred to a 2000 l. vertical autoclave provided with a helical blade agitator passing near the wall and already containing 65 kg. of vinyl chloride in gas and liquid states. After the transfer the autoclave was purged with 65 kg. of vinyl chloride. The agitator was rotated at 10 r.p.m., and the temperature lowered to —20° C. and 610 mm. mercury. Into the autoclave were put 162.5 kg. of transdichloroethylene and 2.440 kg. of ascorbic acid in 60 kg. methanol. The inlet conduit was rinsed with 5 kg. of methanol and 2.440 kg. of hydrogen peroxide (35%) were added and the conduit rinsed with 5 kg. methanol. Agitation proceeded for 15 minutes and 1.220 l. of 1% aqueous ferric sulfate were added, followed by a final rinse with 11.25 kg. methanol. Polymerization continued for a total of 16 hours. After venting residual monomer the yield was 85% of a polymer of spherical granules having a K index of 64 and apparent density of 0.49, of which the granulometry was concentrated as in Table 10.

TABLE 10

| Screen openings (micron): | Percent fallthrough |
|---|---|
| 630 | 99 |
| 500 | 99 |
| 400 | 98 |
| 315 | 96 |
| 250 | 94 |
| 200 | 80 |
| 160 | 78 |
| 100 | 12 |
| 63 | 10 |

82% was between 100 and 250 microns in size.

EXAMPLE 11

A prepolymerizer of 1000 l. capacity, a jacketed autoclave of classical type, received a charge of 715 kg. of vinyl chloride, the said autoclave being purged by release of 65 kg. of monomer to which was also added 36.09 of acetylcyclohexanesulfonyl peroxide, which provided 0.004% of active oxygen based on the weight of the monomer in the autoclave. Prepolymerization was at high turbulence, 62° C. and 9.3 bars pressure. After an hour the polymerization had reached about 9% and the contents were transferred by flow to a 2000 l. vertical, fixed autoclave provided with a helical agitator of ribbon type operating about the central axis of the autoclave, and having a diameter about half that of the autoclave. The conditions of reaction were identical with those of the second stage of Example 10 and the total polymerization time was 16 hours including both stages. After venting the residual monomer there was a recovery of 88% of a powder composed of spherical grains having a K index of 64, an apparent density of 0.51 and the extremely concentrated granulometry of Table 11.

TABLE 11

| Screen openings (micron): | Percent fallthrough |
|---|---|
| 630 | 99 |
| 500 | 99 |
| 400 | 99 |
| 315 | 98 |
| 250 | 95 |
| 200 | 90 |
| 160 | 85 |
| 100 | 10 |
| 63 | 7 |

85% of the particles were between 100 and 250 microns in size.

EXAMPLE 12

A 1000 l. prepolymerizer equipped as in Example 11 received 385 kg. of vinyl chloride monomer of which 35 kg. were vented for purging the autoclave. There were then introduced 19.44 g. of acetylcyclohexanesulfonyl peroxide, yielding 0.0004% of active oxygen, and the temperature of the reaction mass was set at 62° C. and 9.3 bars pressure. After 1 hour 10% polymerization had occurred and the mixture was flowed without substantial change in aperture and pressure to a fixed vertical autoclave of 2000 l. capacity provided with a helical coil agitator of the type described in Example 11. This autoclave had already been supplied with 420 kg. of vinyl chloride monomer of which 70 kg. were vented after the reception of the charge from the prepolymerizer. In all examples the connection between the two autoclaves was closed after the transference of the first charge to the second autoclave. The agitator was run at 10 r.p.m. and the temperature was rapidly lowered to −20° C., which corresponded to 610 mm. mercury absolute. The polymerizer then successively received 175 kg. of transdichloroethylene, 2.625 kg. of ascorbic acid dissolved in 60 kg. of methanol, 5 kg. of methanol to rinse the charging conduit, 2.625 kg. of hydrogen peroxide (35°), and 5 kg. of methanol rinse. The reaction medium was agitated for 15 minutes and 1.312 l. of a 1% aqueous solution of ferric sulfate were added. A final rinse of the conduit added 17.5 kg. of methanol to the reaction mass. The second stage of polymerization went 15 hours at −20° C. and 610 mm. of mercury for an over all total polymerization of 16 hours.

After venting the unreacted monomer to yield was 88% of polymer having a K index of 64, an apparent density of 0.50, and the granulometry of Table 12.

TABLE 12

| Screen openings (micron): | Percent fallthrough |
|---|---|
| 630 | 99 |
| 500 | 99 |
| 400 | 98 |
| 315 | 97 |
| 250 | 96 |
| 200 | 90 |
| 160 | 82 |
| 100 | 13 |
| 63 | 10 |

EXAMPLE 13

A vertical prepolymerizer of the type described in Example 12 received 1100 kg. of vinyl chloride monomer of which 100 kg. were vented and to which 55.52 g. of the same catalyst were added. The temperature was set at 62° C. producing a corresponding internal pressure of 9.3 bars. After an hour of polymerization the reaction mass was flowed into the second stage autoclave of Example 12 which already contained 100 kg. of vinyl chloride monomer, which was vented to purge the autoclave after the transfer. The agitator was rotated at 10 r.p.m. throughout the second stage. The temperature of the reaction mass was mainained at −20° C. with a corresponding absolute pressure of 610 mm. of mercury. 1.875 kg. of ascorbic acid dissolved in 90 kg. of methanol were injected and the conduit rinsed with 5 kg. of methanol. 1.875 kg. of hydrogen peroxide were added and the conduit rinsed with 5 kg. of methanol. The reaction mass was agitated for 10 minutes and 0.938 l. of a 1% aqueous solution of ferric sulfate were added followed by a rinsing of the conduit with 22.5 kg. of methanol. The second stage of polymerization continued under these conditions for 15 hours. After venting the residual monomer the yield was 88% of a powder having a K index of 90±1, of which the apparent density was 0.52 and the granulometry as in Table 13.

TABLE 13

| Screen openings (micron): | Percent fallthrough |
|---|---|
| 630 | 99 |
| 500 | 99 |
| 400 | 99 |
| 315 | 98 |
| 250 | 97 |
| 200 | 90 |
| 160 | 90 |
| 100 | 20 |
| 63 | 8 |

EXAMPLE 14

The conditions of Example 13 were repeated except that the prepolymerization is carried out with ½ of the total quantity of vinyl chloride. The results were comparable to those of Example 13.

When under the same conditions the polymerization was continued to 87%, the apparent density was 0.52, and the granulometry as follows:

TABLE 14

| Screen openings (micron): | Percent fallthrough |
|---|---|
| 630 | 99 |
| 500 | 99 |
| 400 | 98 |
| 315 | 98 |
| 250 | 96 |
| 200 | 92 |
| 160 | 90 |
| 100 | 22 |
| 63 | 10 |

As many apparently widely different embodiments of the present invention may be made without departing from the spirit and scope thereof, it is to be understood that the invention is not limited to the specific embodiments.

What is claimed is:

1. The method of polymerizing a monomeric composition comprising a preponderant part of vinyl chloride, which comprises polymerizing the monomeric composition in mass in two stages, the monomeric composition in the first stage being in liquid form and being agitated to produce turbulent movement throughout the monomer, in the presence of a first catalyst having a short half life selected from the group consisting of acetylcyclohexanesulfonyl peroxide, isopropyl peroxydicarbonate and ethylhexyl peroxydicarbonate, until from about 7% to about 15% of the monomer has been polymerized, and then reducing the degree of agitation to the minimum needed to transfer heat throughout the mixture of monomer and polymer, the improvement which comprises conducting the polymerization in the first stage at a temperature of from about 20° to 75° C., with a corresponding pressure of about 2 to 14 bars, cooling the monomer and polymer between said stages, and conducting the second stage at the reduced degree of agitation in the presence of a redox catalyst system having a longer half life than said first catalyst and selected from the group consisting of systems employing hydrogen peroxide, ferric sulfate and ascorbic acid, systems employing a peroxide and a trialkyl boron hydrazine complex, and systems formed by a peroxide, a trialkyl boron hydrazine complex and molecular oxygen at a substantially lower temperature than the first stage in the range of from about −60° to 20° C. under a pressure corresponding thereto in the range of about 65 mm. of mercury absolute to 2 bars relative.

2. A method according to claim 1 in which the first stage is at a temperature of from 50° to 70° C. and a pressure of about 7 to 12 bars.

3. A method according to claim 1 in which the second stage is at a temperature of about −20° to 0° C. and a pressure of from about 610 mm. of mercury absolute to 0.75 bar relative.

4. A method according to claim 3 in which a bond-breaking agent is present in the second stage.

5. A method according to claim 4 in which the bond-breaking agent is a halogenated hydrocarbon.

6. A method according to claim 5 in which the halogenated hydrocarbon is selected from the group consisting of transdichloroethylene, perchloroethylene, carbon tetrachloride and bromoform.

7. A method according to claim 1 in which an alcohol of low molecular weight is present during the second stage.

8. A method of polymerizing in mass in a single apparatus a monomeric composition comprising a preponderant part of vinyl chloride, which comprises polymerizing the monomeric composition with agitation providing a high degree of turbulence until, during the first stage of polymerization carried out at about 50° to 70° C. under relative pressure of about 7 to 12 bars, a monomeric conversion degree of 7% to 12% is obtained, in the presence of a catalyst selected from the group consisting of acetylcyclohexanesulfonyl peroxide, isopropyl peroxydicarbonate and ethylhexyl peroxydicarbonate having a short half life under the reaction conditions observed during this first stage of polymerization, cooling the reaction medium rapidly so as to arrive at cold polymerization conditions, adding to the reaction medium an alcohol of low molecular weight and a redox catalyst system having a longer half life and selected from the group consisting of systems employing hydrogen peroxide, ferric sulfate and ascorbic acid, systems employing a peroxide and a trialkyl boron hydrazine complex, and systems formed by a peroxide, a trialkyl boron hydrazine complex and molecular oxygen, then carrying out a second stage of reaction at about −20° to 0° C. at a pressure from about 610 mm. of mercury absolute to 0.75 bars relative, the agitation speed being low but high enough to allow heat exchange to take place.

9. A method of making resins which comprises polymerizing vinyl chloride in mass with violent agitation at a temperature on the order of 20° C. to 75° C. with a catalyst of short half life selected from the group consisting of acetylcyclohexanesulfonyl peroxide, isopropyl peroxydicarbonate and ethylhexyl peroxydicarbonate until about 7–15% polymer seeds have formed in the liquid monomer, and growing the seeds in liquid monomer at temperatures on the order of −20° C. to 0° C. in the presence of a redox catalyst system of longer half life and a bond breaker with only mild agitation, the redox catalyst system being selected from the group consisting of systems employing hydrogen peroxide, ferric sulfate and ascorbic acid, systems employing a peroxide and a trialkyl boron hydrazine complex, and systems formed by a peroxide, a trialkyl boron hydrazine complex and molecular oxygen.

References Cited

UNITED STATES PATENTS

| | | | |
|---|---|---|---|
| 2,868,762 | 1/1959 | Oakes | 260—897 A |
| 3,067,186 | 12/1962 | Bessant et al. | 260—92.8 W |
| 3,287,447 | 11/1966 | Faure | 260—899 |
| 2,961,432 | 11/1960 | Fikentscher et al. | 260—92.8 R |
| 3,502,630 | 3/1970 | Borsini et al. | 260—92.8 |

FOREIGN PATENTS

| | | | |
|---|---|---|---|
| 1,427,936 | 2/1966 | France | 260—92.8 |
| 1,382,072 | 11/1964 | France | 260—92.8 |

JOSEPH L. SCHOFER, Primary Examiner

R. S. BENJAMIN, Assistant Examiner

U.S. Cl. X.R.

260—86.3, 87.1, 87.7

UNITED STATES PATENT OFFICE
CERTIFICATE OF CORRECTION

Patent No. 3,759,885           Dated September 18, 1973

Inventor(s) JEAN CLAUDE THOMAS, FRANCIS FOURNEL & SALOMON SOUSSAN

It is certified that error appears in the above-identified patent and that said Letters Patent are hereby corrected as shown below:

Column 1, lines 66 and 67, delete "the granulometry concentrated in relatively few sizes,". Column 3, line 34, after "against" insert -- a --. Column 7, line 43, change "of", second occurence, to -- a --. Column 10, lines 1 and 45, change "0.004%" to -- 0.0004% --. Column 11, line 24, change "(35°)" to -- (35%) --; line 32, change "to" to -- the --.

Signed and sealed this 25th day of December 1973.

(SEAL)
Attest:

EDWARD M. FLETCHER, JR.　　　　　RENE D. TEGTMEYER
Attesting Officer　　　　　　　　Acting Commissioner of Patents